United States Patent Office 3,655,846
Patented Apr. 11, 1972

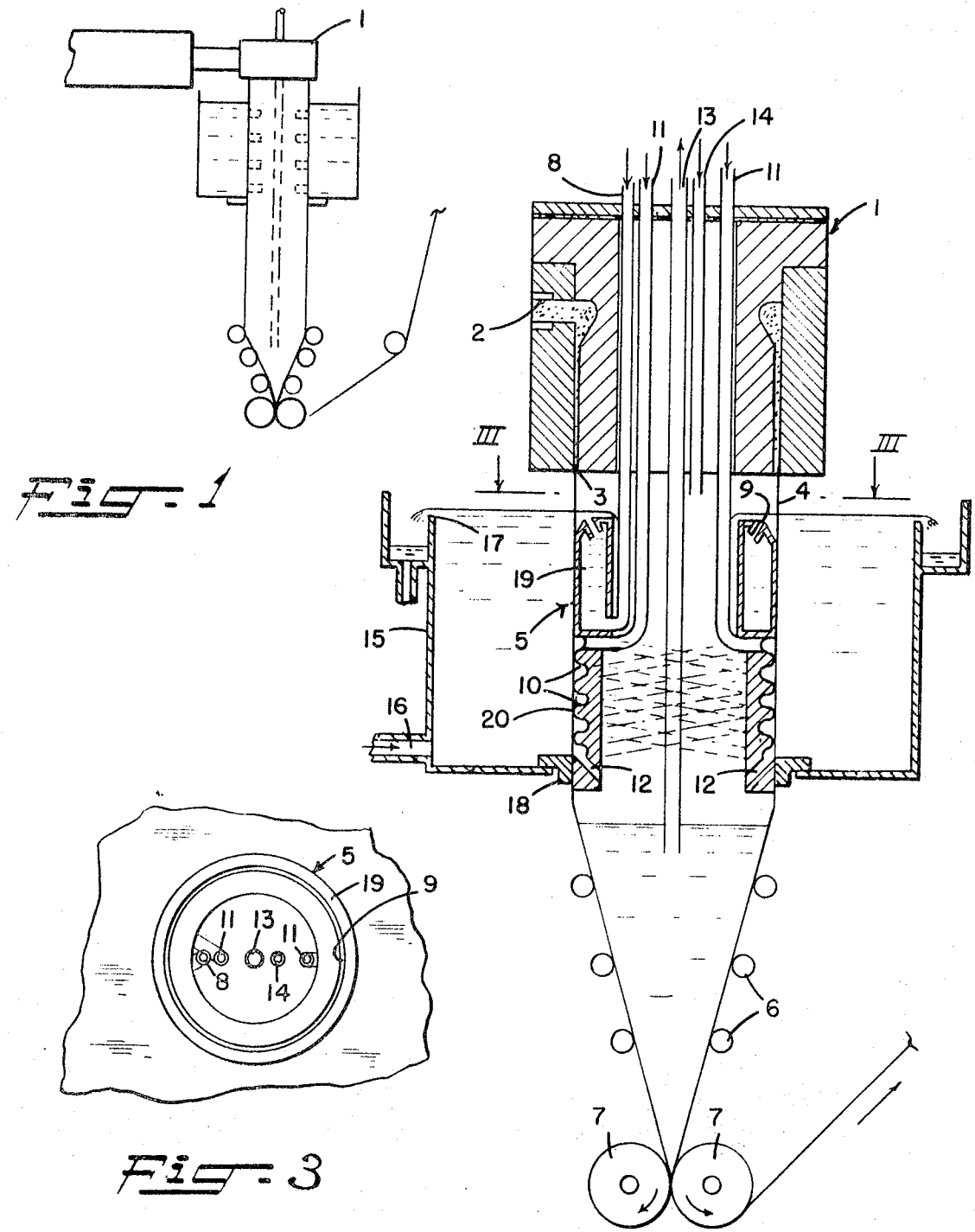

3,655,846
METHOD AND APPARATUS FOR MAKING TUBULAR FILM
Teruchika Kanoh and Ryota Notomi, Shizuoka-ken, Japan, assignors to Kohjin Company, Limited, Tokyo, Japan
Filed Apr. 28, 1969, Ser. No. 819,928
Int. Cl. B29d 23/04
U.S. Cl. 264—89                                      7 Claims

ABSTRACT OF THE DISCLOSURE

Manufacture of continuous tubular films of thermoplastic materials in which a molten tubular film of thermoplastic material is rapidly cooled with liquids concomitantly along its inside and outside surfaces.

---

The present invention relates to an improved method and apparatus for making tubular films from crystalline thermoplastic materials.

It is known in the art to extrude a molten crystalline thermoplastic material through an annular die as a continuous tubular film, cool or quench the extruded tubular film and subsequently reheat and stretch the same radially or along biaxial directions to orient the molecules thereof. For example, biaxial molecular orientation may be achieved by heating the quenched tubular film to a required temperature while it is continuously advanced between spaced pairs of nip rolls and then stretching the same radially, under the pressure of a contained gaseous medium, and simultaneously in a longitudinal direction, by controlling the circumferential speed of the lead and trailing pairs of nip rolls.

A close relationship exists between the crystallinity of the tubular film and its ability to be stretched. Generally, the lower the crystallinity of such film, the easier it is to stretch and molecularly orient the same. Therefore, it is important that rapid cooling be applied to the molten thermoplastic material as it issues from the annular die of an extruder so as to minimize the crystallinity in the resulting tubular film.

While many systems have been proposed for providing rapid cooling of extruded tubular films of molten crystalline thermoplastic materials, none have been entirely satisfactory. For example, external and/or internal air rings generally do not cool the extruded tubular films as rapidly as required, necessitate extremely accurate control to avoid film rupture, and may provide for non-uniform cooling so that the resulting tubular film cannot be properly stretched and/or exhibits poor physical properties. Internally cooled mandrels also provide for too slow a cooling of extruded tubular films and involve the risk of the tubular film adhering to the mandrel surface and tearing. Water applied to the inside and/or outside surfaces of an extruded tubular film may also cool the film too slowly and/or non-uniformly. Accordingly, a primary object of this invention is to provide a generally new and improved and more satisfactory method and apparatus for making tubular films of crystalline thermoplastic material by extrusion.

Another object of this invention is the provision of an improved method and apparatus in which a molten thermoplastic material is extruded as a tubular film and is rapidly cooled or quenched to minimize the crystallinity therein.

Still another object of this invention is to provide an improved method and apparatus for making continuous tubular films by extrusion which are of generally uniform diameter and wall thickness and of substantially like properties throughout their lengths.

A further object is the provision of an improved method and apparatus for making continuous, transparent unoriented tubular films having good clarity and which are readily adapted to be molecularly oriented by radial and/or longitudinal stretching of the same.

The above and other objects of the invention are achieved by a method and apparatus in which a tubular film of molten thermoplastic material, extruded in a generally downward direction, is continuously advanced over and relative to a mandrel where it is cooled along its inside surface while being concomitantly cooled along its outside surface by a bath of cooling liquid. The mandrel has an annular chill member which is of a diameter approximately equal to the inside diameter of the extruded tubular film and serves to control the inside diameter of the tubular film in addition to cooling the inside surface thereof. A stream of cooling liquid is directed helically along the inside surface of the tubular film as it is advanced beyond the annular chill member to further cool the tubular film, after which the tubular film is separated from the cooling liquids and recovered.

Preferably, the tubular film is subjected to a preliminary cooling as it is advanced toward the annular chill member. This preliminary cooling is provided along the outside surface of the tubular film by a portion of the water bath and along the inside surface of such film by a body or pool of liquid. Liquid is continuously passed to and removed from the body or pool of liquid, and its uppermost surface and that of the bath of cooling liquid are maintained substantially even with each other to avoid possible distortion of the tubular film during the preliminary cooling thereof.

The mandrel as well as the body or pool of liquid for preliminary cooling of the extruded tubular film are located below the annular extrusion die. Thus, a gas is contained within the extruded tubular film to prevent collapse, under the pressure of the outside atmosphere, of that portion of the tubular film which is being advanced from the annular extrusion die toward the cooling liquids and mandrel.

The stream of cooling liquid directed helically along the inside surface of the tubular film preferably moves at a high velocity and has a component extending in the direction in which the tubular film is advanced. More than one and preferably a pair of such streams of cooling liquid may be simultaneously directed helically along the inside surface of the tubular film, with the helical paths of such pair of streams being of opposite hand.

Once cooled, the tubular film may be separated from the cooling liquid contained therein by merely flattening the same upon itself. The liquid contained within the still expanded portion of the tubular film is continuously removed therefrom and the flattened film is recovered and either collected or continuously passed onto other processing stages.

The apparatus of the present invention comprises means including a die having an annular opening for extruding molten thermoplastic material in a generally downward direction as a continuous tubular film, means for cooling the extruded tubular film, and means for continuously forwarding the cooled tubular film to thereby continuously advance the trailing portions of the tubular film away from the extrusion die and relative to the cooling means. The cooling means includes a mandrel which is fixed in position below the extrusion means and has an outside diameter approximately equal to the diameter of the annular opening of the extrusion die, and a tank for containing a bath of cooling liquid through which the tubular film passes as it is advanced relative to the mandrel. One portion of the mandrel has a continuous outside surface and means for cooling such surface, while another portion of the mandrel has at least one helical groove along which flows a liquid for cooling the inside surface of the tubular film. Means are also provided for removing from within the tubular film and at a location beyond the mandrel, liquid which has been used for cooling the inside surface of such film.

More particularly, the mandrel is of generally tubular configuration with the one portion thereof being in the form of a chamber having a continuous or unbroken outside surface and an opening along the top thereof. Means are provided for continuously delivering cooling liquid to this annular chamber, from which it overflows through the opeing therein forming a body or pool of liquid above the chamber, and passes through the inside of the tubular mandrel and into the tubular film itself.

The one or more helical grooves which extend along the outside surface of the mandrel are supplied at their uppermost ends with cooling liquid under pressure which, after flowing along such grooves at a relatively high velocity, is also discharged into the tubular film. If the mandrel is formed with a pair of helical grooves, such grooves are of opposite hand.

The portion of the tubular film which is being advanced away from the annular die and toward the cooling means is prevented from collapsing under the pressure of the outside atmosphere by a contained gas. A conduct for supplying such gas, together with the means for delivering cooling liquids into the tubular film and supporting the mandrel, all extend up through the annular die so that the tubular continuity of the extruded film is at all times maintained.

Liquid delivered into the tubular film for cooling the same is contained therein by a pair of driven nip rolls which are located well below the mandrel and serve to both advance and flatten the now cooled tubular film. Preferably, a conventional collapsing frame cooperates with the nip rolls in flattening the tubular film. The liquid contained within the tubular film by the nip rolls is removed therefrom by a conduit which extends up through the tubular mandrel and the annular extrusion die.

The tank for containing the bath of cooling liquid whch contacts with the outside surface of the tubular film does not extend below the lower end of the mandrel and includes, in its bottom wall, an annular member formed of soft, elastic material which prevents or minimizes the escape of liquid from the tank yet permits the tubular film to move smoothly as it is advanced relative to the mandrel. Means are provided for continuously supplying cooling liquid to and for removing spent liquid from the tank to maintain the liquid bath at a desired generally uniform temperature.

With the method and apparatus of the present invention, the pressures exerted on the inside and outside surfaces of the extruded tubular film, prior to and during the cooling thereof, are substantially equal and thus no apparent distortion of the tubular film occurs. For the sake of economy and convenience, the gas and cooling liquids employed in the practice of the present invention are preferably air and water, respectively. The temperature of such water may, of course, be varied to effect cooling of a particular extruded thermoplastic material at a desired rate. The method and apparatus of the present invention are adapted for use with a variety of different crystalline plastic materials or combinations thereof, as for example polyethylene and polypropylene resins, and as hereafter described in detail as employed in the manufacture of tubular films of crystalline polypropylene resins.

A tubular film formed by the method and apparatus of the present invention is essentially unoriented and exhibits a uniform diameter and wall thickness. As a result of the rapid cooling of the extruded thermoplastic material, crystallization is minimized and the resulting tubular film exhibits good transparency and is readily adapted to be molecularly oriented by known stretching methods and apparatus.

In the drawing:

FIG. 1 is a diagrammatic illustration of the apparatus of the present invention;

FIG. 2 is a vertical section taken through the apparatus of the present invention; and FIG. 3 is a horizontal section taken generally along the line III—III of FIG. 2.

With reference to the drawing, the apparatus of the present invention includes a circular die 1 having a passage 2, into which a molten thermoplastic resin is delivered from a conventional extruder, and an annular opening or silt 3 from which the molten thermoplastic material is extruded downwardly as a continuous tubular film 4. A mandrel 5 maintains the tubular film 4 at approximately its extruded diameter during the cooling thereof, as hereafter described in detail, after which the cooled tubular film is engaged by rolls 6 of a conventional collapsing frame and flattened as it is passed between nip rolls 7. Suitable means are provided for continuously and positively driving the nip rolls 7 in the directions as indicated by arrows, whereby the extruded tubular film 4 is continuously advanced away from the die 1 and over the mandrel 5.

As seen in FIG. 2, the mandrel 5 is of tubular configuration and includes a chamber 19 having a continuous or unbroken outer wall which serves to control or maintain the inside diameter of the tubular film 4 at approximately that at which it was extruded as such film is slidably advanced relatively thereto. A cooling liquid, such as water, is continuously delivered into the chamber 19 through a pipe 8, which extends up through the circular die 1 and to a suitable supply source. Cooling liquid overflows from the chamber 19 through an annular slit or orifice 9 provided in the top wall thereof, where it subjects the inside surface of the tubular film 4 to a preliminary cooling as such film is advanced toward the mandrel 5. This overflowing liquid passes through the center of the mandrel 5 and is contained within the tubular film 4 by the nip rolls 7.

The cylindrical portion 20 of the mandrel 5 below the chamber 19 is provided along its outside surface with a pair of helical grooves 10 which, as illustrated in FIG. 2, are of opposite hand. Cooling liquid, such as water, is delivered under pressure into each of the helical grooves 10 at the uppermost ends thereof by pipes 11 which extend up through the circular die 1 and connect with a supply source. Flowing along the helical grooves 10, this liquid cools the inside surface of the tubular film 4 as it is slidably advanced relative to the mandrel 5. The liquid flows from the lowermost ends of the helical grooves 10, inwardly of the mandrel 5 through openings 12, and is also contained within the tubular film 4 by the nip rolls 7.

The liquid which is collected within the tubular film 4 is continuously removed therefrom through a conduit 13 which also extends up through the circular die 1.

A gas, such as air, is delivered into the extruded tubular film 4 through a pipe 14 and serves to maintain that portion of the film which is moving away from the die 1 and toward the mandrel 5 at approximately its extruded diameter. This particular portion of the tubular film 4 is still in a molten condition and thus the gas contained within such film prevents its collapse under the pressure of the outside atmosphere.

Concomitantly with the cooling of the inside surface of the tubular film 4, its outside surface is cooled by a bath of cooling liquid, such as water, contained within a tank 15. Cooling liquid is continuously conducted into the tank 15 near its bottom wall by a pipe 16 so that liquid along the top surface of such bath flows over a weir 17 and into a suitable discharge trough. An opening is provided in the bottom wall of the tank 15 to permit the passage of the tubular film 4 therethrough and is encircled by a soft elastic material 18 which prevents or minimizes the escape of liquid from the tank 15 yet permits the tubular film 4 to move smoothly as it is slidably advanced along the mandrel 5.

As illustrated, the mandrel 5 is supported in fixed position by the different pipes which extend through the circular die 1. Means separate from such pipes may be used to support the mandrel 5 in fixed position, with such means extending also up through the circular die 1 and being connected to a suitable fixed structure. The tank 15 is also supported in fixed position, as by a suitable structural frame, not shown.

In the operation of the above-described apparatus, a molten thermoplastic material, such as crystalline polypropylene, is advanced from a conventional extruder, into the passage 2 of the circular die 1 and issues from the annular die opening or slit 3 as a continuous tubular film 4. This film 4 is passed over the mandrel 5, gradually collapsed by the rolls 6 of a conventional collapsing frame and laced in-between the positively driven nip rolls 7. Air is introduced into the tubular film 4 through the pipe 14 under a pressure sufficient to maintain that portion of the film advancing from the die 1 to the mandrel 5 at approximately its extruded diameter.

The tubular film 4 is subjected to a preliminary cooling by the pool of liquid above the chamber 19 and the bath of cooling liquid in the tank 15. Rapid cooling of the tubular film 4 continues as it is slidably advanced over the mandrel 5, with both the inside and outside surfaces thereof being simultaneously cooled. More particularly, the inside surface of the tubular film 4 is cooled by the chamber 19, into which cooling liquid is continuously delivered by the pipe 8, and also by the cooling liquid delivered by the pipes 11 and flowing, preferably at high velocity, along the helical grooves 10 in the cylindrical mandrel portion 20. At the same time the outside surface of the tubular film 4 is cooled by the liquid contained and circulated in the tank 15.

The liquid delivered into the tubular film 4 is collected above the nip rolls 7 and is continuously removed therefrom through the conduit 13.

Tubular films formed by the method of the present invention, as described above exhibit little crystallinity as a result of the rapid cooling thereof during formation, and are of substantially uniform diameter and wall thickness throughout their lengths. Such tubular films have been found to be easily oriented along uniaxial or biaxial directions by conventional procedures and particularly by the method and apparatus as disclosed in the U.S. patent application of Tsuboshima et al., Ser. No. 706,172, now U.S. Pat. 3,499,064.

We claim:

1. A method of making a tubular film of thermoplastic material including the steps of extruding molten thermoplastic material in a generally downward direction as a continuous tubular film, continuously advancing the extruded tubular film of molten thermoplastic material away from the location of extrusion, at a location spaced from the location of extrusion cooling the successive portions of the advancing tubular film along the inside surfaces thereof by engaging such surfaces sequentially with an annular pool of cooling liquid, a chilled annular member harving an outside diameter approximately equal to the inside diameter of the extruded tubular film, and at least one stream of cooling liquid directed helically along such surfaces and having a component in the direction of film advancement, cooling with a confined bath of cooling liquid the successive portions of the advancing tubular film along the outside surfaces thereof concomitantly with the cooling of such successive portions along the inside surfaces thereof with the uppermost surfaces of the pool of liquid and bath of cooling liquid being maintained at substantially the same level, at a location below the location of film cooling flattening the advancing tubular film upon itself across its entire width to thereby contain the liquid which was directed helically along the inside surfaces of the successive portions of the tubular film during the cooling thereof, delivering cooling liquid to the annular pool to control the temperature thereof whereby excess liquid overflows from such pool, passes relative to the annular chill member and is also contained within the tubular film above the location of flattening thereof, removing such contained liquid upwardly through the advancing tubular film, and at a location beyond the location of film flattening recovering the tubular film.

2. A method as defined in claim 1 wherein two streams of cooling liquid are simultaneously directed helically along the inside surfaces of the successive portions of the tubular film as they are advanced beyond the chilled annular member, with the helical paths of the streams of cooling liquid being of opposite hand and intersecting with each other.

3. A method as defined in claim 1 further including the step of maintaining a gas under pressure within that portion of the tubular film which is being advanced away from the location of extrusion, the pressure of such gas being substantially equal to that of the atmosphere outside of the tubular film to prevent distortion of the successive molten portions of the advancing tubular film.

4. Apparatus for making tubular film from thermoplastic material comprising means including a die having an annular opening for extruding molten thermoplastic material in a generally downward direction as a continuous tubular film, means positioned below and spaced from said extrusion means for cooling the extruded tubular film, means below and spaced from said cooling means for flattening the tubular film on itself across its entire width, and means for continuously forwarding the cooled tubular film to thereby continuously advance the successive trailing portions of the tubular film away from said extrusion means and relative to said cooling means, said cooling means including an annular mandrel over which the successive portions of the extruded tubular film are advanced, said mandrel having an outside surface which is of a diameter approximately equal to the diameter of said die opening and which is uninterrupted at the upper portion of said mandrel, means on said mandrel defining an annular chamber adjacent to said uninterrupted mandrel surface and projecting above the outside surface of said mandrel, means for delivering a cooling liquid to said annular chamber for maintaining the uninterrupted outside surface of said mandrel at a desired temperature, an orifice at the upper end of said mandrel opening into said chamber whereby liquid flowing into said chamber collects at the uppermost end of said mandrel as a pool and from which pool excess liquid overflows into and through the annular mandrel and is contained within the tubular film by said film flattening means, a groove extending helically along the outside surface of said mandrel below the uninterrupted portion thereof, means for delivering a cooling liquid to said helical groove at the upper end thereof, said helical groove terminating and being open at the lowermost end of said mandrel whereby cooling liquid delivered to and traveling along said helical groove is discharged from the lowermost end of the mandrel and is also contained within the tubular film by said film flattening means, said cooling means further including walls positioned adjacent to and cooperating with the outside surface of said mandrel to provide an annular tank and means outwardly of said mandrel for maintaining witihn said tank a bath of cooling ilquid having its uppermost surface substantially level with that of the pool at the uppermost end of said mandrel, and means for removing from within the tubular film liquid contained therein by said film flattening means.

5. Apparatus as defined in claim 4 wherein the means for flattening the tubular film on itself includes a pair of nip rolls, wherein said means for continuously forwarding the cooled tubular film includes means for driving said nip rolls, and wherein the means for removing liquid from within the tubular film includes a conduit extending through said die and annular mandrel.

6. Apparatus as defined in claim 4 wherein at least two helically-extending grooves are provided along the outside surface of the mandrel below the uninterrupted portion thereof, said grooves being of like configuration but of opposite hand so as to intersect with each other.

7. Apparatus as defined in claim 4 wherein said means for delivering cooling liquid to said chamber and helical groove, and said means for removing liquid from within the tubular film extend through said die and annular mandrel.

References Cited

UNITED STATES PATENTS

| | | | |
|---|---|---|---|
| 3,090,998 | 5/1963 | Heisterkamp et al. | 264—95 X |
| 3,193,547 | 7/1965 | Schott, Jr. | 264—209 |
| 3,311,682 | 3/1967 | Ringley et al. | 264—95 |
| 3,320,637 | 5/1967 | Van Dijk | 264—209 X |

FOREIGN PATENTS

| | | | |
|---|---|---|---|
| 802,939 | 10/1958 | Great Britain | 8—14 A |
| 1,428,166 | 1/1966 | France | 264—95 |

ROBERT F. WHITE, Primary Examiner

A. M. SOKAL, Assistant Examiner

U.S. Cl. X.R.

18—145; 264—95